United States Patent [19]
Green et al.

[11] 3,762,595
[45] Oct. 2, 1973

[54] PRESSURE RELIEF DEVICE FOR SEALED ELECTRICAL APPARATUS

[75] Inventors: Robert W. Green; Louis F. Ettlinger, both of Conover, N.C.

[73] Assignee: General Electric Company

[22] Filed: Dec. 6, 1971

[21] Appl. No.: 204,966

[52] U.S. Cl.......... 220/44 R, 220/85 TC, 220/46 R, 220/55 AN
[51] Int. Cl............................................ B65d 51/16
[58] Field of Search.................. 220/55 PC, 55 AN, 220/44, 46, 40 S, 85 TC; 215/56

[56] References Cited
UNITED STATES PATENTS
2,600,703  6/1952  Strom............................ 220/44 R
2,552,642  5/1951  Morrison....................... 220/44 R
1,959,191  5/1934  Acly............................ 220/55 AN

*Primary Examiner*—George T. Hall
*Attorney*—Francis X. Doyle et al.

[57] ABSTRACT

A pressure relief device for sealed electrical apparatus. The sealed apparatus comprises a container provided with a cover member having a flared edge which mates with a bead formed on the top of the container. A gasket member is provided between the bead and the flared edge of the cover. A cover band substantially surrounds the container engaging the flared edge of the cover and the lower portion of the bead. A bolt member is provided between the ends of the cover band to draw the cover band tightly against the cover and bead thereby effectively sealing the cover to the container. The gasket, the flared edge of the cover and the mating surface of the bead are designed such that at high pressures within the sealed container the gasket will be displaced, at least into the area of the bolt location of the cover band, thereby venting such high pressures. If desired, a lubricant can be provided to the gasket to minimize friction between the gasket and the mating parts of the cover and tank.

7 Claims, 3 Drawing Figures

PATENTED OCT 2 1973 3,762,595
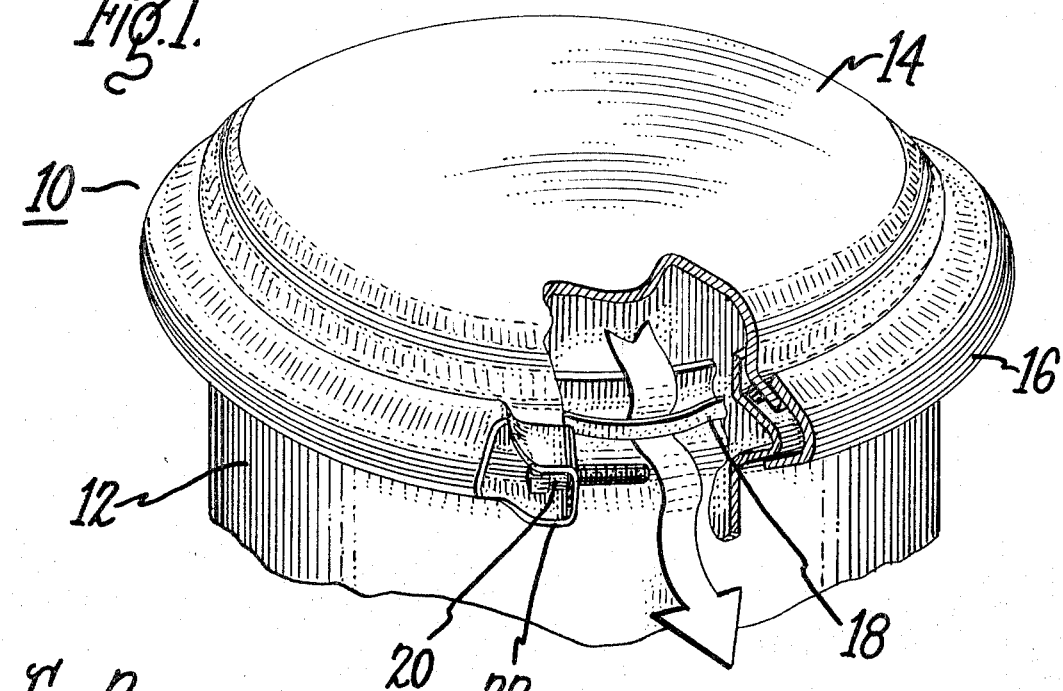
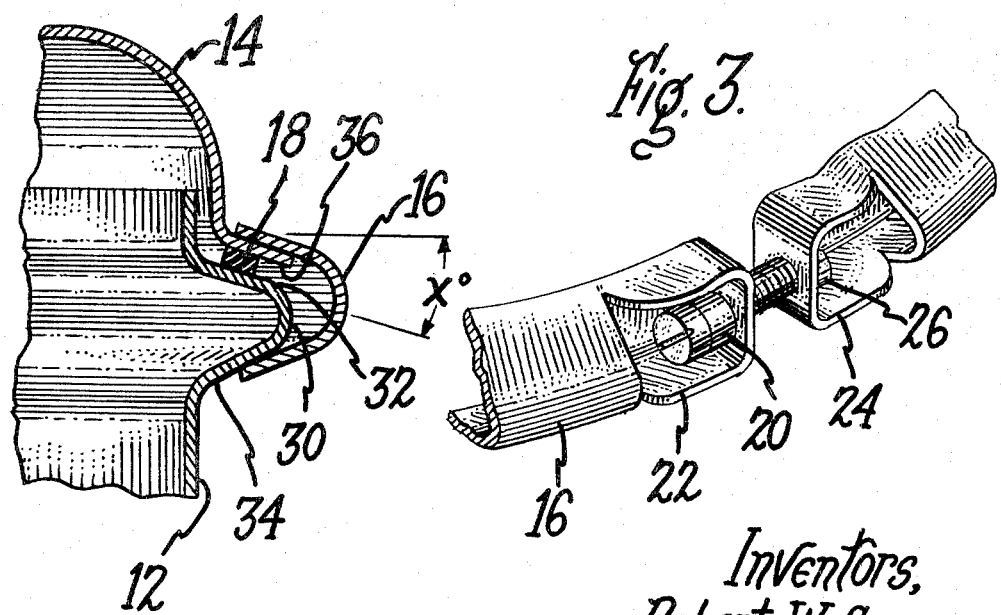
Inventors,
Robert W. Green,
Louis F. Ettlinger,
by Francis X. Doyle
Their Attorney.

3,762,595

PRESSURE RELIEF DEVICE FOR SEALED ELECTRICAL APPARATUS

BACKGROUND OF THE INVENTION

This invention relates to sealed electrical apparatus and more particularly to a pressure relief device for such sealed electrical apparatus.

As is well understood, much electrical apparatus today is sealed in containers and is usually provided with a cooling and insulating fluid. Such electrical apparatus, for example, a distribution transformer is occasionally subjected to high internal pressure due to fault conditions within the electrical apparatus. This internal pressure can build up until it ruptures the container. Also, if it does not rupture the container, it can build up to levels which can endanger a workman who subsequently opens such electrical apparatus for repair.

In the past, it had been the practice to provide a frangible diaphragm in the container so as to release such dangerous pressures. Other solutions have been provided by various types of pressure actuated valves which would open, or valves which could be opened, to release dangerous pressures. Most all distribution transformers are provided with a vent plug in the container near the cover. Instructions are normally provided for the opening of such plug to release internal pressure prior to the removal of the cover of the sealed container.

All of the above solutions to the internal pressure problem have certain weaknesses from the manufacturer's or from the user's viewpoint. All of the automatic pressure relief devices are costly and often do not provide sufficient discharge area to prevent dangerous pressure buildup under severe fault conditions. The manual type of pressure relief device requires that the workman activate a valve, rupture a disk or remove a plug in order to insure the release of pressure prior to opening of the container. Obviously, in the latter type, if the workman neglects to manually actuate the valve, he could be seriously injured when the container is opened. Further, under continuous fault or severe fault conditions the pressure buildup with a manually actuated pressure relief could cause a rupture of the tank.

There is clearly a need in the electrical apparatus art for a pressure relief device which will be low in cost, which will automatically relieve high pressure conditions in the electrical apparatus and which will necessarily be actuated by a workman in opening of the sealed container.

It is, therefore, one object of this invention to provide a low cost pressure relief device for sealed electrical apparatus.

A further object of this invention is to provide a pressure relief device for sealed electrical apparatus that will automatically vent the sealed container at high pressures.

A still further object of this invention is to provide a pressure relief device for sealed electrical apparatus which will automatically vent the container whenever a workman attempts to open the sealed container.

SUMMARY OF THE INVENTION

Briefly, in one form, this invention provides a pressure relief for an electrical apparatus sealed in a container. In the preferred form, the container is provided with a beaded portion while a cover member has a flared edge which is parallel to the mating surface of the beaded portion. A gasket is mounted on the beaded portion and contacted by the flared edge of the cover. A cover band is provided which engages the outer area of the flared edge and the beaded portion. A bolt member is provided in the ends of the band to draw such band tight and seal the container. On excess pressures, the gasket, at least at the area of the bolt member, will be expelled from between the beaded portion and the flared lip of the cover thereby releasing or venting the pressure within the container.

The invention which is sought to be protected will be particularly pointed out and distinctly claimed in the claims appended hereto. However, it is believed that this invention and the manner in which its various objects and advantages are obtained as well as other objects and advantages thereof will be better understood by reference to the following detailed description of a preferred embodiment of the invention, particularly when considered in the light of the accompanying drawing.

BRIEF DESCRIPTION OF THE DRAWING

FIG. 1 is a perspective view of a portion of a container and cover with parts broken away showing the preferred embodiment of this invention applied thereto;

FIG. 2 is a sectional view of the cover and container of FIG. 1 showing the invention in greater detail; and FIG. 3 is a partial perspective view of the cover band and bolt of this invention.

DESCRIPTION OF PREFERRED EMBODIMENT OF THE INVENTION

This invention relates to a pressure relief device for a sealed electrical apparatus. It is especially useful for sealed distribution transformers or other device, such as switches or the like, that are sealed in containers and usually are insulated and cooled by a dielectric fluid. The drawing merely shows a portion of a container with the cover sealed thereto to illustrate the preferred embodiment of this invention. Such embodiment will now be described with reference to the drawing, in which like numerals are used to indicate like parts throughout the various views.

Referring first to FIG. 1, a sealed electrical apparatus 10 is shown comprising a container 12 containing the apparatus and a cover 14 having a cover band 16 which is used to firmly secure cover 14 to container 12. As is usual, a gasket 18 is provided between the mating surfaces of the container 12 and the cover 14 and the gasket 18 is compressed between such mating surfaces by the cover band 16. As will be readily understood, cover band 16 is tightened to force cover 14 against container 12 and the gasket 18 by means of a bolt member 20 which is mounted in one end 22 of cover band 16. The other end 24 of cover band 16 (see FIG. 3) may be tapped or it may be provided with a nut, such as nut 26 there shown. As bolt 20 is screwed into nut 26, ends 22 and 24 are pulled toward each other causing the cover 14 to be pressed against a mating surface of container 12 thereby compressing gasket 18 between such mating surfaces.

The contour of the mating surfaces and the cover band 16 are best shown in FIG. 2 to which reference will now be made. As there shown, container 12 is provided with a beaded portion 30 having an upper surface 32 which forms an acute angle X with and below the horizontal. The lower surface 34 of bead 30 provides a camming surface for the cover band 16, as is understood. The cover 14 is provided with a flared edge 36 which is substantially parallel to the surface 32 of bead 30. As can be seen, the gasket 18 fits on surface 32 and will be compressed between surface 32 and flared edge 36 by the cover band 16. The cover band 16 is substantially U-shaped, the sides of the U being angular as shown, so that as the bolt 20 is tightened, the sides of the cover band 16 will ride inwardly on surface 34 of bead 30 and flared edge 36 of cover 14, pressing the flared edge 36 toward surface 32 and thereby compressing gasket 18 therebetween.

As is shown in FIG. 2, the surface 32 of bead 30 and flared edge 36 of cover 14 are parallel and form an acute angle X to the horizontal. This allows the gasket 18 to be displaced outwardly on excess pressure buildup within the sealed apparatus 10. The cover band 16 will always be open between the ends 22 and 24 thus providing space for gasket 18 to displace, for example, as shown in FIG. 1. When gasket 18 is displaced, the excess pressure within apparatus 10 will vent as indicated by the arrow in FIG. 1. In order to prevent gasket 18 from adhering to surface 32 and flared edge 36 due to aging of the gasket and also to provide less friction between the gasket and the mating surfaces, a gasket grease or lubricant may be applied to the gasket 18.

As will be understood, besides the gasket being displaced and thereby venting excess pressure, in accordance with this invention due to the contour of mating surfaces 32 and 36, as the cover band 16 is released by backing off of bolt 20 the gasket will be released as the pressure on the mating surfaces decreases. As the gasket is released due to the loosening of cover band 16, any pressure within the container 12 will be slowly released through the movement of the gasket 18 thereby preventing the opening of the cover on dangerous pressures within the container 12. As will be understood, as the cover band 16 is loosened, it will allow substantial displacement of gasket 18 before sufficient loosening has resulted to allow the cover 14 to be removed from the tank 12. It is during this period that all of the excess pressure within the container 12 will be released thereby preventing the opening of the cover on dangerous tank pressures.

In various tests which have been made on containers using this invention, the gasket is displaced and the pressure vents at various pressures usually depending on the size of the tank. For example, on 13 inches to 14 inches diameter tanks, test results have shown that the pressure within the tank will vent when the pressure has built approximately 36 p.s.i. On larger tanks, such as, for example, 17 inches to 21 inches diameter tanks the pressure only reaches approximately 30 p.s.i. prior to venting. Using the design of the cover 14, the bead 30 and cover band 16 as shown in the drawing, the container and cover have withstood 52 p.s.i. without damage to the cover, container or band. In the preferred embodiment, the preferred angle X is in the range of approximately 15° to 25° to provide proper displacement of the gasket 18. However, other angles may be used and still obtain the benefits of the invention.

While there has been shown and described the present preferred embodiment of the invention, it will be understood that such description is by way of illustration and not limitation. The scope of the invention is set forth in the appended claims.

What is claimed as new and what is desired to secure by Letters Patent of the United States is:

1. A pressure relief vent for a sealed container comprising a beaded portion on said container, a cover sealing said container, said cover having a flared lip substantially parallel to the upper surface of said beaded portion, a cover band surrounding said container and contacting said bead and said flared lip, a gasket compressed between said upper surface and said flared lip by said cover band, said gasket being displaced by excess pressure in said container.

2. A pressure relief vent as set forth in claim 1 in which said upper surface of said beaded portion forms an acute angle with and below the horizontal.

3. A pressure relief vent as set forth in claim 2 in which said acute angle is in the range of approximately 15° to 25°.

4. A pressure relief vent as set forth in claim 1 in which a gasket lubricant is applied to said gasket.

5. A pressure relief vent for a sealed container comprising a beaded portion on said container, said beaded portion having an upper surface forming an acute angle to the horizontal and below the horizontal, a cover sealing said container, said cover having a flared lip substantially parallel to said upper surface of said beaded portion, a cover band of substantially U-shape surrounding said container and contacting said bead and said flared lip, a gasket compressed between said upper surface and said flared lip by said cover band, said gasket being displaced by excess pressure in said container.

6. A pressure relief vent as set forth in claim 5 in which a gasket lubricant is applied to said gasket.

7. A pressure relief vent as set forth in claim 5 in which said acute angle is in the range of approximately 15° to 25°.

* * * * *